(12) United States Patent
Zhang et al.

(10) Patent No.: US 11,393,199 B2
(45) Date of Patent: Jul. 19, 2022

(54) INFORMATION DISPLAY METHOD

(71) Applicant: YUTOU TECHNOLOGY (HANGZHOU) CO., LTD., Hangzhou (CN)

(72) Inventors: Fuyao Zhang, Hangzhou (CN); Yiming Chen, Hangzhou (CN)

(73) Assignee: YUTOU TECHNOLOGY (HANGZHOU) CO., LTD., Hangzhou (CN)

( * ) Notice: Subject to any disclaimer, the term of this patent is extended or adjusted under 35 U.S.C. 154(b) by 155 days.

(21) Appl. No.: 16/930,679

(22) Filed: Jul. 16, 2020

(65) Prior Publication Data

US 2021/0019525 A1    Jan. 21, 2021

(30) Foreign Application Priority Data

Jul. 19, 2019    (CN) .......................... 201910655695.X

(51) Int. Cl.
| | |
|---|---|
| G09G 5/00 | (2006.01) |
| G06V 20/20 | (2022.01) |
| G06F 16/955 | (2019.01) |
| G06N 20/00 | (2019.01) |
| G06F 16/9535 | (2019.01) |

(52) U.S. Cl.
CPC ............ *G06V 20/20* (2022.01); *G06F 16/955* (2019.01); *G06F 16/9535* (2019.01); *G06N 20/00* (2019.01)

(58) Field of Classification Search
CPC .................................................. G06T 19/006
See application file for complete search history.

(56) References Cited

U.S. PATENT DOCUMENTS

| | | | |
|---|---|---|---|
| 2015/0123966 A1* | 5/2015 | Newman | G06T 19/006 345/419 |
| 2017/0131964 A1* | 5/2017 | Baek | G06T 19/006 |
| 2017/0156589 A1* | 6/2017 | Wu | G06V 40/193 |

FOREIGN PATENT DOCUMENTS

| | | |
|---|---|---|
| CN | 107391060 A | 11/2017 |
| CN | 107704828 A | 2/2018 |

OTHER PUBLICATIONS

CN 201910655695.X—First Office Action dated Jul. 2, 2021, 18 pages, (with English translation).
CN 201910655695.X—Second Office Action dated Nov. 3, 2021, 15 pages, (with English translation).

* cited by examiner

*Primary Examiner* — Charles Tseng
(74) *Attorney, Agent, or Firm* — Getech Law LLC; Jun Ye

(57) ABSTRACT

The present invention relates to an information display method and system, and a terminal. The method includes: collecting a visual signal in a target area of a display device by using an augmented reality device; judging a user reading scene according to the visual signal; generating a first signal according to the user reading scene; generating a second signal after processing the first signal; collecting a target parameter of the display device; generating a display signal after fusing the second signal with the target parameter; and performing information display on a display interface of the augmented reality device according to the display signal. By adopting the information display method and system, and the terminal of the present invention, the reading efficiency of the user may be improved.

15 Claims, 9 Drawing Sheets

INFORMATION DISPLAY METHOD

FIELD OF THE INVENTION

The present invention relates to the technical field of information providing methods, in particular to an information display method.

BACKGROUND OF THE INVENTION

The existing reading behavior of human based on the display screens of an electronic device is to scroll the screen vertically or horizontally and obtain the reading content in the screen in a linear growth situation. Within a unit time, the amount of information that a reader can obtain is related to the size of the screen and the reading speed of the reader, and the main information obtained by the reader is directly related to the current reading theme, and the extended content needs to be obtained by the reader in a linear growth trend during the process of continuously scrolling the screen. The reader needs to read texts or pictures and perform understanding, analysis and judgment in a unit area to obtain the key content of the reading information.

Based on the above descriptions, when a user uses a multimedia screen to read or view screen information, the sum of the amounts of information obtained within the unit time is limited by the current display content of the screen, and the information subject is directly related to the theme of the information content viewed by the user, and the extended content needs to be gradually improved as the user gradually scrolls the screen content and the time increases, at the same time, the user needs to filter out the main part of the viewing content according to his intuitive judgment and understanding. This form of viewing and reading is less efficient and the amount of information obtained within the unit time is also extremely limited.

Such information obtaining method has the following problems:

(1) The efficiency is low;
(2) The obtained amount of information is limited; and
(3) Human understanding and analysis ability has a great influence on the obtained content, and the objectiveness is biased.

The present invention helps users quickly obtain more effective reading information and the extended information within a short time by using reality-enhanced glasses, computer vision and cloud computing. The present invention can make the reading efficiency and analysis, judgment and understanding of the users more rapid and simple.

Therefore, in order to facilitate the user operations, shorten the operation time, increase the functions of automatic analysis and display of analysis results and improve the intelligence level at the same time, an information display method is urgently needed to overcome the above problems.

SUMMARY OF THE INVENTION

The objective of the present invention is to provide an information display method and system, and a terminal. A visual signal in a target area can be automatically collected and is processed according to a preset method to generate a second signal, the second signal is fused with a device target parameters and is displayed at last, through automatic collection, processing, retrieval, fusion and display, the reading efficiency of a user is improved on one hand, on the other hand, the analysis, judgment and retrieval results are directly displayed to the user, cumbersome operations and manual analysis and judgment of the user are not required, so that the information is received more quickly and simply, and the user experience is further improved.

The objective of the present invention is achieved by the following technical solutions. The information display method proposed according to the present invention includes the following steps: collecting a visual signal in a target area of a display device by using an augmented reality device; judging a user reading scene according to the visual signal; generating a first signal according to the user reading scene; generating a second signal after processing the first signal; collecting a target parameter of the display device; generating a display signal after fusing the second signal with the target parameter; and performing information display on a display interface of the augmented reality device according to the display signal.

The objective of the present invention can be further achieved by the following technical measures.

According to the foregoing information display method, the target parameter is the relative position of the display device relative to the augmented reality device; and/or, the target parameter is the size of the display device relative to the target area of the augmented reality device.

According to the foregoing information display method, the visual signal includes: image information of a reality scene in the target area and/or information of a foreground process of the display device.

According to the foregoing information display method, when the visual signal includes the information of the foreground process of the display device, the step of judging the user reading scene includes: monitoring the current foreground process of the display device; collecting the attribute of the foreground process of the display device; if the attribute of the foreground process satisfies a preset condition, determining the type of the foreground process; and determining the user reading scene according to the type of the foreground process.

According to the foregoing information display method, when the foreground process is a browser process, the step of judging the user reading scene includes: monitoring a website domain name currently visited by the browser; collecting the attribute of the website domain name; if the attribute of the website domain name satisfies a preset condition, determining the type of the website domain name; and determining the user reading scene according to the type of the website domain name.

According to the foregoing information display method, when the visual signal includes the image information of the reality scene in the target area, the step of judging the user reading scene includes: determining the user reading scene represented by the image information by using a machine learning algorithm.

According to the foregoing information display method, the step of generating the second signal after processing the first signal includes: analyzing all contents in the first signal; screening out a first target content from all contents; and generating the second signal according to the first target content.

According to the foregoing information display method, the step of generating the second signal according to the first target content includes: screening the first target content and generating a second target content; searching for the second target content, and generating a first search result; generating a third target content according to the first search result;

searching for the third target content, and generating a second search result; and determining the second search result as the second signal.

According to the foregoing information display method, the step of searching for the third target content includes: dividing the third target content into a plurality of different sub-contents according to preset conditions; assigning different priorities to the plurality of the sub-contents according to preset conditions; and searching for the plurality of the sub-contents, and generating a first priority search result, a second priority search result and a third priority search result.

According to the foregoing information display method, the step of generating the second search result includes: calculating the visual signal according to the first priority search result to generate a first calculation result; and if a parameter comparison result of the first calculation result and the second priority search result satisfies a preset condition, determining the first calculation result as the second search result.

According to the foregoing information display method, the step of generating the second search result includes: calculating the visual signal according to the first priority search result to generate a first calculation result; and if a parameter comparison result of the first calculation result and the second priority search result does not satisfy a preset condition, determining the third priority search result as the second search result.

According to the foregoing information display method, the step of generating the display signal after fusing the second signal with the target parameter includes: updating the target parameter in real time; adjusting the display position of the second signal according to the target parameter; and determining the adjusted second signal as the display signal.

Prior to the step of performing information display on the display interface of the augmented reality device according to the display signal, the foregoing information display method further includes: adjusting the display number and the layout design of the second signal according to the target parameter.

Prior to the step of determining the adjusted second signal as the display signal, the foregoing information display method further includes: adjusting the display area according to the target parameter and the character size of each content in the second signal.

After the step of generating the second signal after processing the first signal, the foregoing information display method further includes: detecting a device use state; and if the device use state satisfies a preset condition, inputting the second signal in a device input window.

According to the foregoing information display method, the display manner of performing information display on the display interface of the augmented reality device is: performing superposed display on the target area of the display device; and/or, determining a display area according to the target parameter beyond the target area of the display device for display.

The objective of the present invention is also achieved by the following technical solutions. An information display system proposed according to the present invention includes: modules for executing the steps of any one of the foregoing information display methods.

The objective of the present invention is also achieved by the following technical solutions. A computer-readable storage medium proposed according to the present invention stores a computer program thereon, and the program implements any one of the foregoing information display methods when executed.

The objective of the present invention is also achieved by the following technical solutions. A terminal proposed according to the present invention includes a memory, a processor, and a computer program stored on the memory and executable on the processor, and the processor implements any one of the foregoing information display methods when executed by the computer program.

Compared with the prior art, the present invention has obvious advantages and beneficial effects. By means of the above technical solutions, the information display method and system, and the device proposed by the present invention at least have the following advantages and beneficial effects:

(1) Collection, processing, retrieval, integration and display are automatically completed, thereby improving the intelligence level of the system;

(2) The reading efficiency of users is improved; and (3) The results of the analysis and judgment are displayed directly to the users, and cumbersome operations and manual analysis and judgment of the users are not needed, so that the information is received more quickly and simply.

The above description is only an overview of the technical solutions of the present invention. In order to understand the technical means of the present invention more clearly, the present invention can be implemented in accordance with the contents of the specification, and in order to make the above and other objectives, features and advantages of the present invention more obvious and understandable, preferred embodiments are listed below and are descried in detail below in combination with drawings.

Corresponding relationship between reference signs and names in FIG. 1 to FIG. 13: Terminal 10000, memory 11000, computer program 11100, processor 12000.

DETAILED DESCRIPTION OF THE EMBODIMENTS

In order to further illustrate the technical means and effects adopted in the present invention to achieve the intended purpose of the invention, specific embodiments, structures, features and effects of an information display method and system, and a terminal proposed in accordance with the present invention are described in detail below, in conjunction with the drawings and preferred embodiments.

Although each embodiment represents a single combination of application steps, the steps of different embodiments of the present invention can be replaced, or combined, so the present invention can also be considered to include all possible combinations of steps in the same and/or different embodiments described. Thus, if one embodiment includes steps A, B, and C, and another embodiment includes a combination of steps B and D, then the present invention is also considered to include an embodiment of all other possible combinations including one or more of steps of A, B, C, and D, even if the embodiment may not be clearly written in the following content.

An information display method provided by the embodiment of the present invention will be described in detail below in combination with the drawings.

Figure 1:
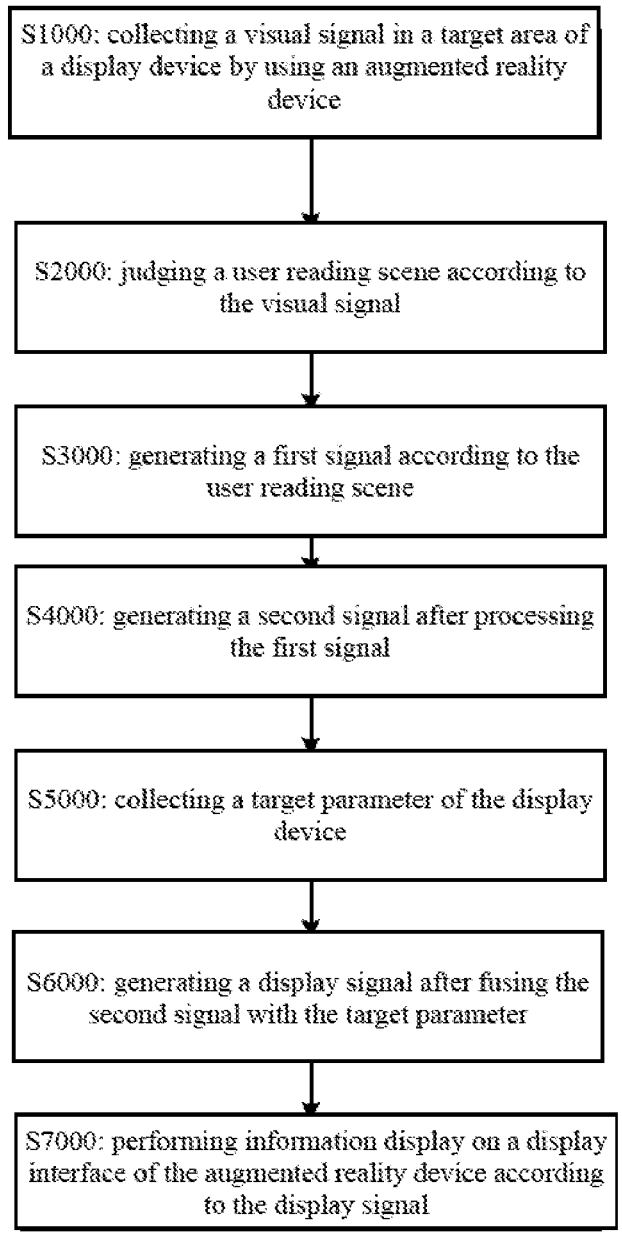
FIG. 1 is a flow block diagram of an information display method according to one embodiment of the present invention.

FIG. 1 is a flow block diagram of an information display method according to one embodiment of the present invention. Please refer to FIG. 1, the information display method according to an example of the present invention mainly includes the following steps:

S1000: collecting a visual signal in a target area of a display device by using an augmented reality device The display device can include, but not limited to, a smart phone, a mobile computer, a smart watch, a tablet computer, a palmtop computer, a personal digital assistant (Personal Digital Assistant, PAD), an interactive smart tablet, or other apparatuses with display functions or other wearable devices, navigation apparatuses, or other devices that can display image information. The augmented reality (Augmented Reality, AR) device, includes, but not limited to, AR glasses, AR helmets, smart phones and other devices that can integrate real-world information with virtual world information.

In some embodiments, the target area refers to an area that is preset according to the type and the model number of the device, and refers to a display screen area of the device in some other embodiments.

Those skilled in the art should understand that, as long as there is a visual signal in the device area, this area can be used as the target area of the device, and whether or not the area has been set in the system in advance, it should fall within the protection scope of the present invention.

In some embodiments, the visual signal is the image information of a reality scene in the target area (including a display device, and image and text information presented by the display device, or the like), such as a webpage, an application use status page, or other image information. In some other embodiments, the visual signal is the information of a foreground process of the display device, such as an APP running in the foreground, a link (URL) of a foreground browser, or other information that can indicate the current display content of the display device.

In some embodiments, a collection task is executed by a collection module of the augmented reality device (or AR device). In a specific embodiment, the collection module is AR glasses. More specifically, the collection task is implemented by a camera on the AR glasses. Those skilled in the art should understand that, as long as the collection task can be completed, it should fall within the protection scope of the present invention, regardless of whether the collection module is the AR glasses or other related AR derivative devices.

S2000: judging a user reading scene according to the visual signal

The type of the visual signal is obtained by classifying conventional visual signals according to conditions, the conditions can be set by the user and can also be set in advance by a developer. Of course, the conditions can also be the same as the conventional classification methods. By classifying the visual signals by type, it is beneficial to calling corresponding algorithm modules for different types of visual signals in the subsequent information processing, so as to reduce the amount of calculation of information processing.

The user reading scene can be a shopping scene, a news scene, a stock market scene and other scenes preset for each user according to the reading habits. For example, when the foreground process opened by the user is a certain shopping APP, then the current user reading scene is the shopping scene. The visual signal corresponds to the user reading scene, so that the occupation of hardware resources can be effectively reduced, and at the same time, a vision algorithm module for a single reading scene is opened to improve the analysis efficiency and higher accuracy of the user reading content.

Figure 2:
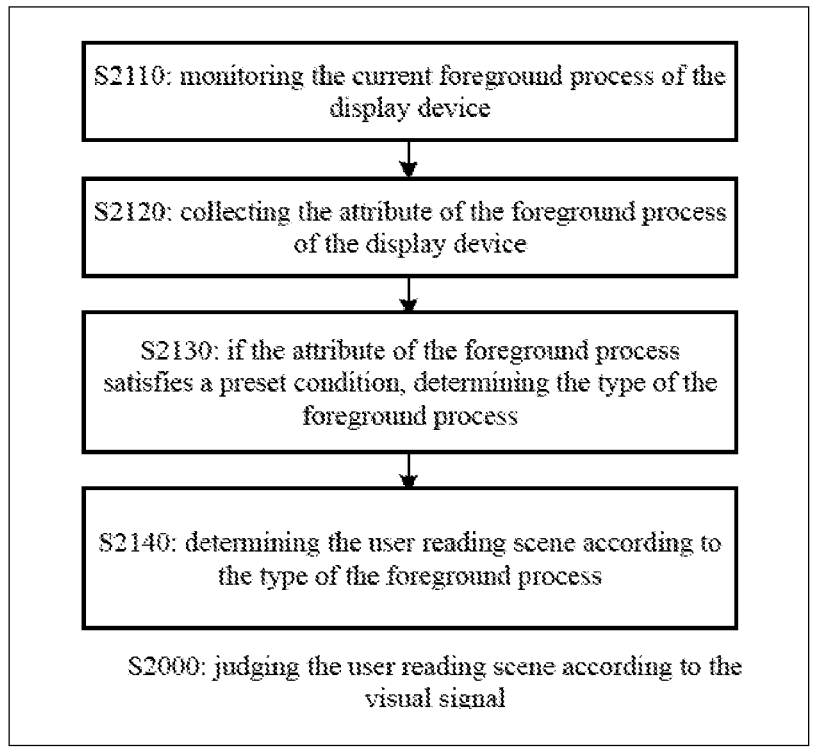
FIG. 2 is a flow block diagram of an information display method according to one embodiment of the present invention.

In some embodiments, please refer to FIG. 2, the step S2000 includes the following steps:

S2110: monitoring the current foreground process of the display device

The process can be an application process provided by the display device, an application process downloaded by the display device, or other application processes. Those skilled in the art should understand that, any program that can characterize the process should fall within the protection scope of the present invention.

S2120: collecting the attribute of the foreground process of the display device

The attribute of the foreground process refers to an attribute that can distinguish different processes, or an attribute that can distinguish different types of processes.

S2130: if the attribute of the foreground process satisfies a preset condition, determining the type of the foreground process S2140: determining the user reading scene according to the type of the foreground process In the method provided by the present application, the type of the visual signal can be judged according to the process in the display device, so that only the active process in the foreground of the device needs to be detected, thereby reducing the number of monitoring indicators, improving the monitoring efficiency, and reducing the requirements for the monitoring ability of the product, as a result, the cost of the product is reduced, and the market competitiveness is improved.

Figure 3:
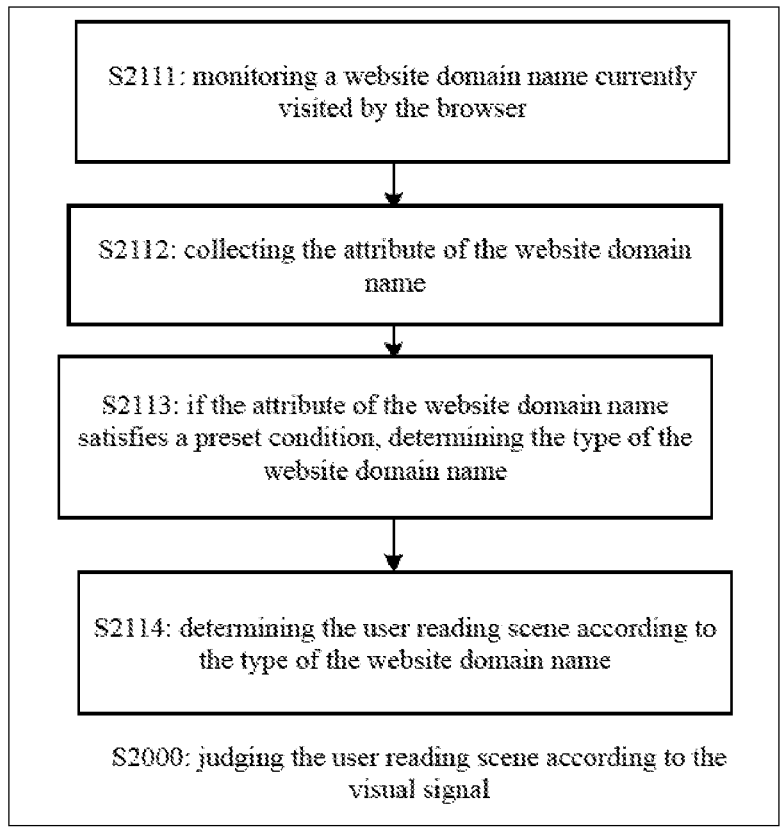
FIG. 3 is a flow block diagram of an information display method according to one embodiment of the present invention.

In some other embodiments, referring to FIG. 3, when the foreground process is a browser process, the step S2000 includes the following steps:

S2111: monitoring a website domain name currently visited by the device

S2112: collecting the attribute of the website domain name

In some embodiments, the registration information of the website domain name is tracked by the website domain name, so as to read an attribute parameter corresponding to the website domain name, and the type of the website domain name is further obtained to facilitate the execution and implementation of the subsequent steps.

S2113: if the attribute of the website domain name satisfies a preset condition, determining the type of the website domain name S2114: determining the user reading scene according to the type of the website domain name In the method provided by the present application, the type of the visual signal can be judged according to the website domain name accessed in the device, so that only the attribute of the website domain name needs to be collected, thereby reducing the number of collected attribute parameters, improving the collection efficiency, and reducing the requirements for the collection capacity of the product, as a result, the cost of the product is reduced, and the market competitiveness is improved.

In some other embodiments, when the visual signal includes the image information of the reality scene in the target area, the step of judging the user reading scene includes: determining the user reading scene represented by the image information by using a machine learning algorithm. Specifically, in actual use, for example, AR glasses are aligned with a laptop computer, and the obvious information of the current viewing content of the user is analyzed by a scene judgement vision algorithm module to judge the use scene, such as an article title, a product title, picture information, or the like. This module collects multiple feature information at the same time, and merges the information to determine the scene. For example, relevant product name, price and other feature information of a product picture should appear on the screen, so as to determine what type of scene of the user is currently viewing more accurately. Scene. In the present solution, there is no need for the laptop computer and the AR glasses to communicate with each other, so only the image information is needed to determine the current reading scene of the user, thereby shortening the communication time, improving the efficiency, and further improving the user experience. In the present embodiment, the machine learning algorithm can be a clustering algorithm, a neural network algorithm, a deep learning algorithm, and other algorithms that recognize and classify images.

S3000: generating a first signal according to the user reading scene

Different user reading scenes activate the corresponding vision algorithm modules, and the vision algorithm modules analyze the contents of the user and screen out the main content in the reading contents of the user to generate the first signal containing one or more keywords. In one embodiment, when the user reading scene is the "shopping scene", then the first signal contains information such as product shopping, shopping website name, brand, product, price, and so on. In one or more embodiments, keyword extraction can be performed by performing image identification collection on the reading scene, or by analyzing the foreground process or URL corresponding to the reading scene.

S4000: generating a second signal after processing the first signal

The processing the first signal refers to processing the first signal according to user needs or preset steps. Because the first signal is processed in the present invention, so the processing of unnecessary information in the first signal in subsequent steps is avoided, thereby reducing the requirements for the computing power of the product, expanding the application range, further improving the processing speed and efficiency, and improving the user experience at last.

Figure 4:
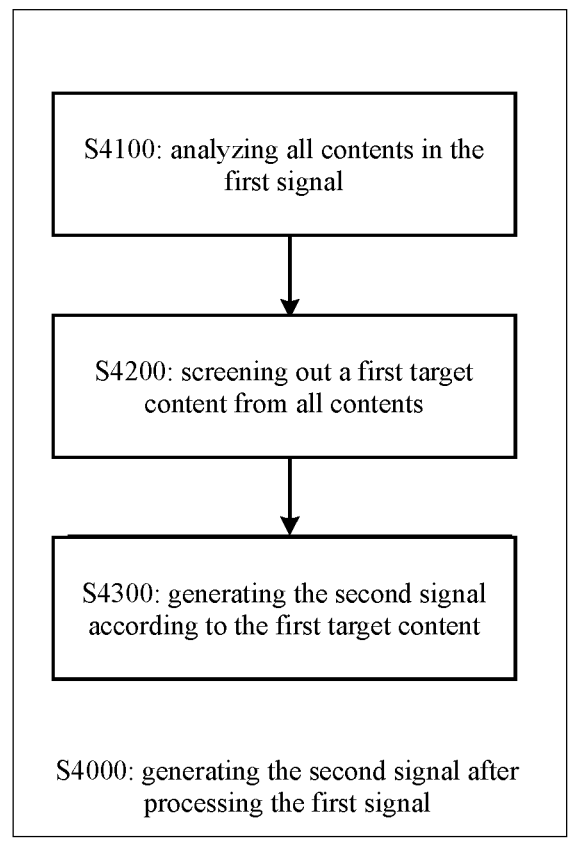
FIG. 4 is a flow block diagram of an information display method according to one embodiment of the present invention.

In some embodiments, please refer to FIG. 4, the S4000 includes:

S4100: analyzing all contents in the first signal;

S4200: screening out a first target content from all contents;

Screening refers to screening according to a preset condition. The preset condition may be set and stored in advance, or may be stored locally or on a server after being updated in real time. Those skilled in the art should understand that, as long as the screening function can be achieved, it should fall within the protection scope of the present invention.

S4300: generating the second signal according to the first target content

Figure 5:
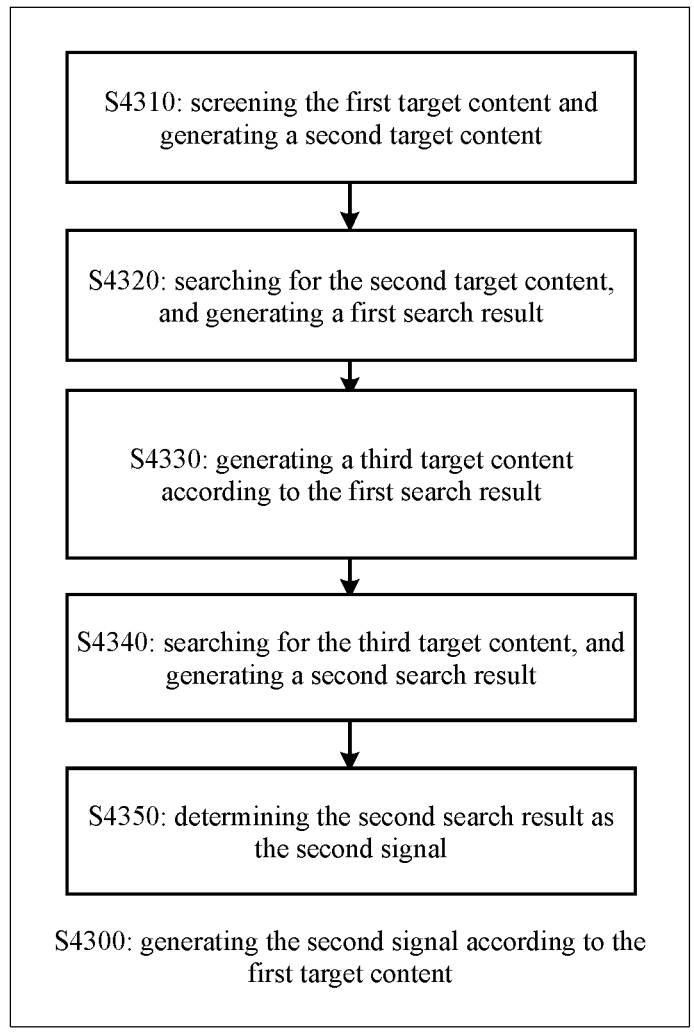
FIG. 5 is a flow block diagram of an information display method according to one embodiment of the present invention.

In some embodiments, please refer to FIG. 5, S4300: the step of generating the second signal according to the first target content includes:

S4310: screening the first target content and generating a second target content S4320: searching for the second target content, and generating a first search result S4330: generating a third target content according to the first search result S4340: searching for the third target content, and generating a second search result In the information display method provided by the present invention, by continuously generating the target contents for searching, the search contents are more accurate, and the further obtained search results are more accurate, thereby being more in line with the analysis and judgment standards of the user. Therefore, there is no need for the user to participate in the analysis and judgment operations too much, thereby improving the reading efficiency, making the product more intelligent, and further improving the market competitiveness.

Specifically, the step S4340 includes a step S4341 of searching for the third target content and a step S4342 of generating the second search result.

Figure 6:
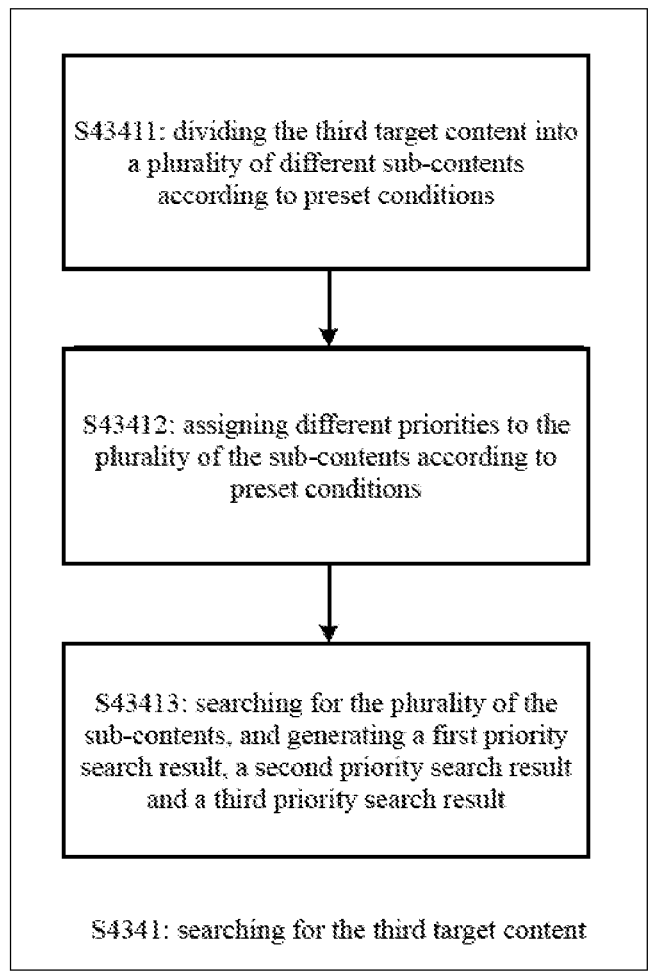
FIG. 6 is a flow block diagram of an information display method according to one embodiment of the present invention.
Figure 7:
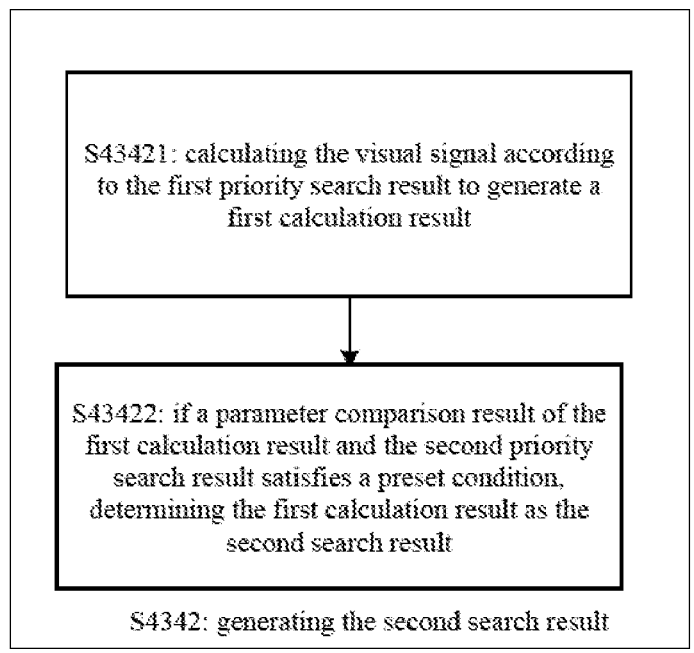
FIG. 7 is a flow block diagram of an information display method according to one embodiment of the present invention.

In some embodiments, please refer to FIG. 6, S4341: the step of searching for the third target content includes:

S43411: dividing the third target content into a plurality of different sub-contents according to preset conditions S43412: assigning different priorities to the plurality of the sub-contents according to preset conditions S43413: searching for the plurality of the sub-contents, and generating a first priority search result, a second priority search result and a third priority search result The search can be a search from the network in a networked state, a search in a local database, or a search in the server.

Because different sub-contents are assigned with different priorities, so the search can be performed according to the priority, in this way, the performance utilization rate of the product can be improved, and it is convenient to directly view the results in order of priority at the same time, thereby shortening the time of selecting the required results while viewing the results, improving the efficiency and being more user-friendly.

Those skilled in the art should understand that, assigning different priorities to different sub-contents does not mean that the search must also be performed in order of priority. In some embodiments, the search is still performed in parallel, and in some other embodiments, the retrieval is performed in order of priority In some embodiments, please refer to FIG. 7, S4342: the step of generating the second search result includes:

S43421: calculating the visual signal according to the first priority search result to generate a first calculation result;

S43422: if a parameter comparison result of the first calculation result and the second priority search result satisfies a preset condition, determining the first calculation result as the second search result By comparing the parameters of the first calculation result and the second priority search result, the result that meets the preset condition can be screened out as the second search result, so that the search result is more in line with the condition, thereby avoiding adding unnecessary calculated amount in the subsequent steps and ensuring better intelligence.

Figure 8:
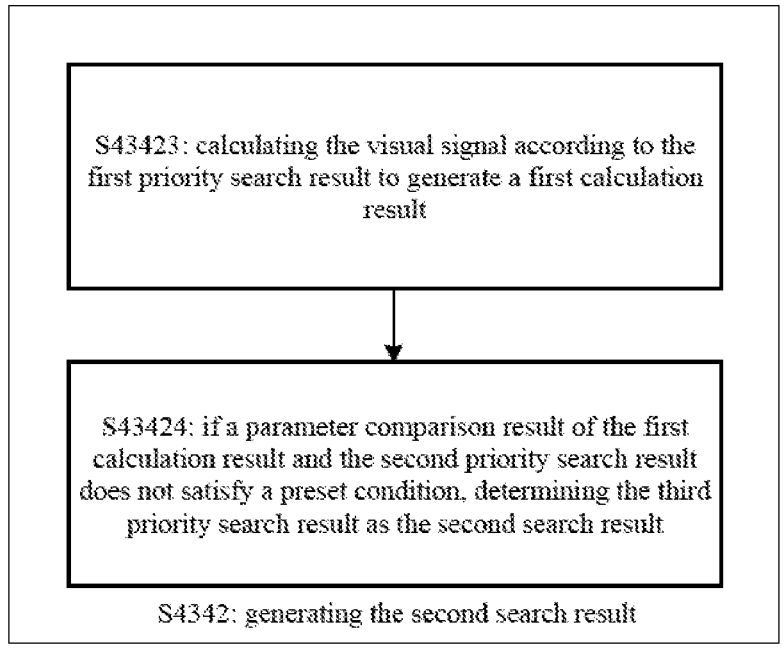
FIG. 8 is a flow block diagram of an information display method according to one embodiment of the present invention.

In some other embodiments, please refer to FIG. 8, S4342: the step of generating the second search result includes:

S43423: calculating the visual signal according to the first priority search result to generate a first calculation result;

S43424: if a parameter comparison result of the first calculation result and the second priority search result does not satisfy a preset condition, determining the third priority search result as the second search result By comparing the parameters of the first calculation result and the second priority search result, the result that does not meet the preset condition can be released, and only the third priority search result is retained, so that the search result is more in line with the condition, thereby avoiding adding unnecessary calculated amount in the subsequent steps and reducing the requirements for the storage space and computing space of the product, in this way, the production cost is reduced, better intelligence is ensured, and the market competitiveness is improved.

S4350: determining the second search result as the second signal

Figure 10:
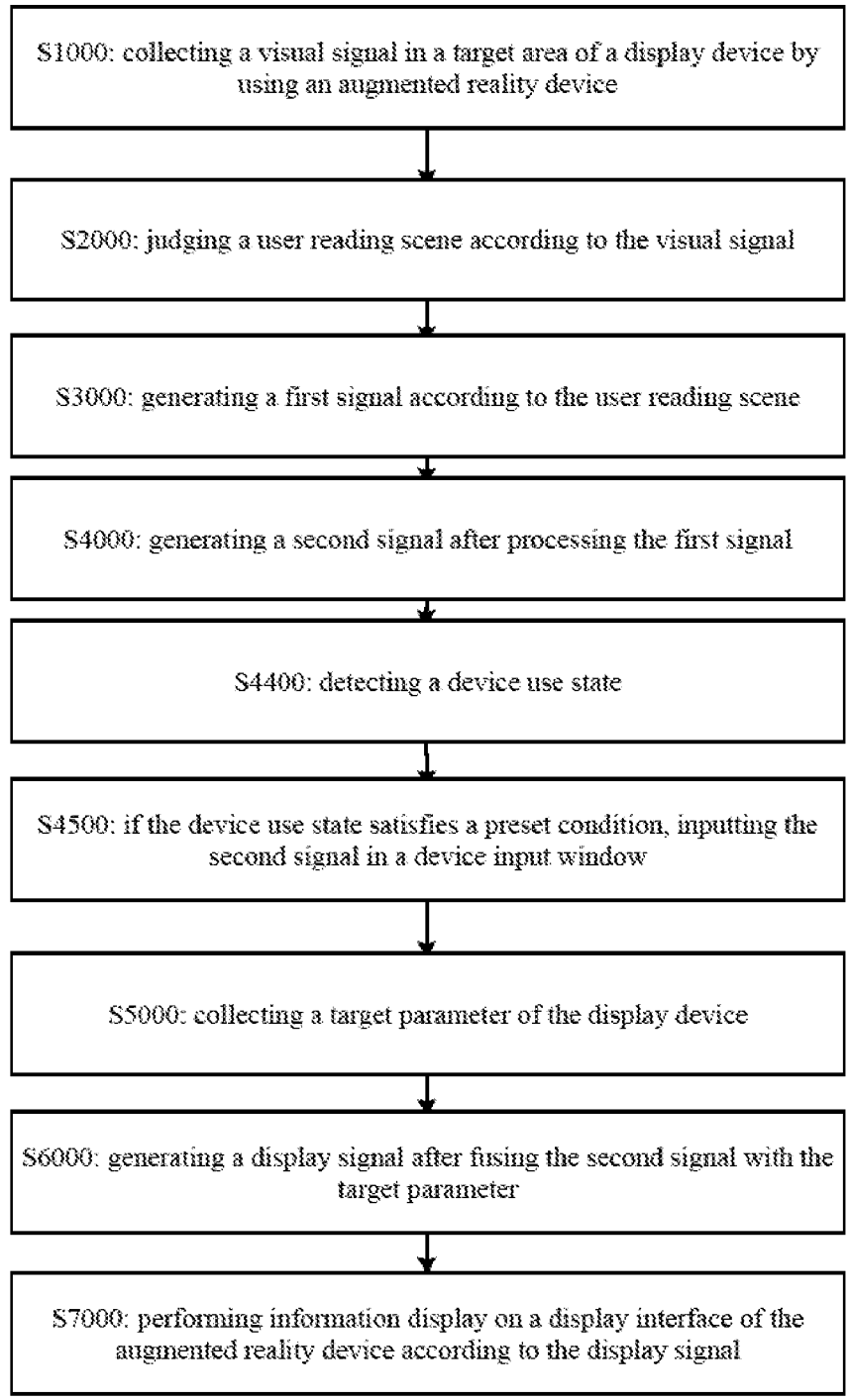
FIG. 10 is a flow block diagram of an information display method according to one embodiment of the present invention.

In some embodiments, please refer to FIG. 10, after step S4000: generating the second signal after processing the first signal, the method further includes:

S4400: detecting a device use state;

S4500: if the device use state satisfies a preset condition, inputting the second signal in a device input window In the present invention, the device use state is detected, after the satisfies the preset condition, the second signal is input in the device input window, in this way, manual input of the user according to the second result can be avoided, thereby being more intelligent, meanwhile, improving the efficiency and avoiding the waste of time, thus making it more practical and improving the user experience.

S5000: collecting a target parameter of the display device

The target parameter refers to the own parameters of the display device and parameters between the display device position and a collection module.

In some embodiments, the target parameter refers to the relative position of the display device relative to the collection module. For example, the target parameter is an angle, a distance or the like of a certain part of the device relative to a certain part of the collection module. Optionally, the relative position refers to the relative position of the device relative to the collection module; optionally, the position information refers to the numbers of degrees of included angles of the device relative to different coordinate axes of the collection module. In some embodiments, the included angles refer to the included angles between a camera in the collection module and different coordinate axes in a device coordinate system.

In some other embodiments, the target parameter refers to the size of an own display screen of the device or the size of the display screen.

In some other embodiments, the target parameter refers to the size of the device relative to the target area of the collection module, that is, relative to the collection module, the size of the target area of the device relative to a collection unit. Because the relative size herein changes with the relative distance, angle and position between the collection module and the device. Specifically, the relative size of the target area can be calculated according to the own parameters and the relative position of the device, for example, the relative size of the target area is calculated according to the size of the display screen of the device and the distance of the device relative to the collection module to obtain the target parameter.

Specifically, the collection module refers to a mobile device, and the mobile device can be augmented reality glasses (or called AR glasses, smart glasses) or other augmented reality devices (or called AR devices), virtual reality devices (or called VR Devices), mobile computers, smart phones, smart watches, or other wearable devices, navigation apparatuses, or other devices that can collect the target parameter of the device.

Those skilled in the art should understand that, the above-mentioned collection module may itself have the function of collecting the target parameter of the device, or it may collect the target parameter information of the device with the help of other devices, as long as the device can collect the target parameter of the device, it should fall within the protection scope of the present invention.

Figure 9:
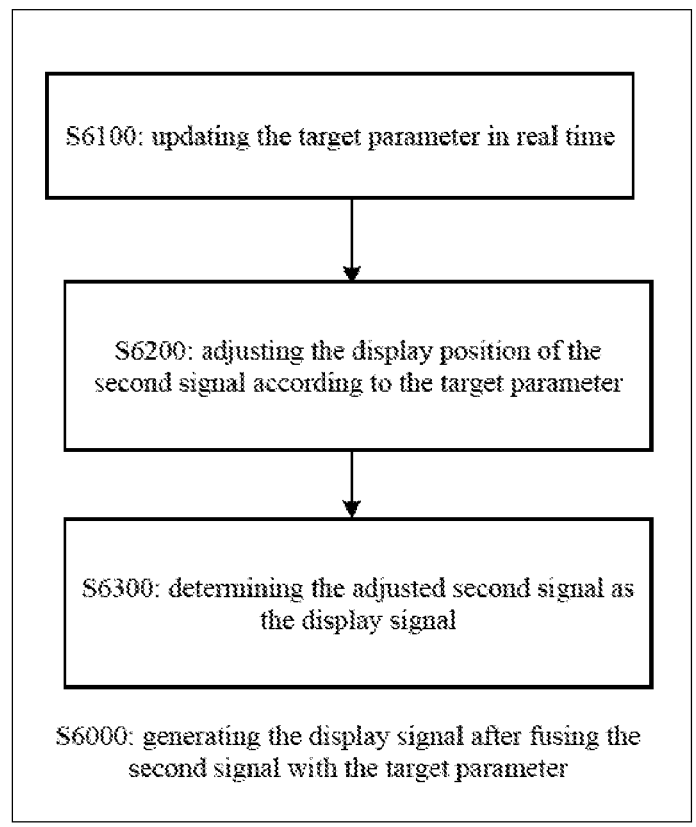
FIG. 9 is a flow block diagram of an information display method according to one embodiment of the present invention.

S6000: generating a display signal after fusing the second signal with the target parameter In some embodiments, please refer to FIG. 9, the S6000 includes:

S6100: updating the target parameter in real time;

The updating the target parameter in real time can include: updating the target parameter at a preset time interval, updating the target parameter at a fixed time interval or updating the target parameter continuously. Specifically, the preset time can be time periods with different lengths and can also be time periods with varying lengths.

S6200: adjusting the display position of the second signal according to the target parameter The adjustment can include changing relevant parameters of the second signal to achieve the purpose of adjusting the position, and can also include calculating a display position parameter of the second signal through the target parameter, and then changing the relevant parameters to achieve the purpose of adjustment.

S6300: determining the adjusted second signal as the display signal

In some embodiments, prior to the step of displaying the display signal, the method further includes: adjusting the display number and the layout design of the second signal according to the target parameter.

Because in some embodiments, the second signal contains multiple pieces of content, so it is convenient to adjust the display number according to the target parameter, thereby better facilitating the display, and further making the display interface more friendly.

In some other embodiments, prior to the step of determining the adjusted second signal as the display signal, the method further includes:

adjusting the display area according to the target parameter and the character size of each content in the second signal.

Because in some embodiments, the character size of each content in the second signal is not necessarily the same, and they cannot be adapted to the display area, so it is convenient to use the method of the present invention to adjust the display area according to the target parameter and the character size of each content in the second signal, thereby better facilitating the display, and further making the display interface more friendly.

S7000: performing information display on a display interface of the augmented reality device according to the display signal In some embodiments, the manner of displaying the display signal is: performing superposed display on the target area of the display device, since the display signal is superposed on the target area, the display signal is superposed with the visual signal, in this way, the user can concentrate on reading the information, thereby improving reading efficiency. In some embodiments, the transparency and color of the display signal are also adjusted to facilitate distinguishing the information in the target area, thereby avoiding the situation of image confusion after the information is superposed, further facilitating the user reading, and improving the reading experience.

In some other embodiments, the manner of displaying the display signal is: determining a display area according to the target parameter beyond the target area of the display device for display. Optionally, the display signal is displayed on at least one side around the target area, so it is convenient to read the display signal and the visual signal separately, thereby avoiding the situation of image confusion generating by superposing the display signal with the visual signal, further facilitating the user reading, and improving the reading experience.

Figure 13:
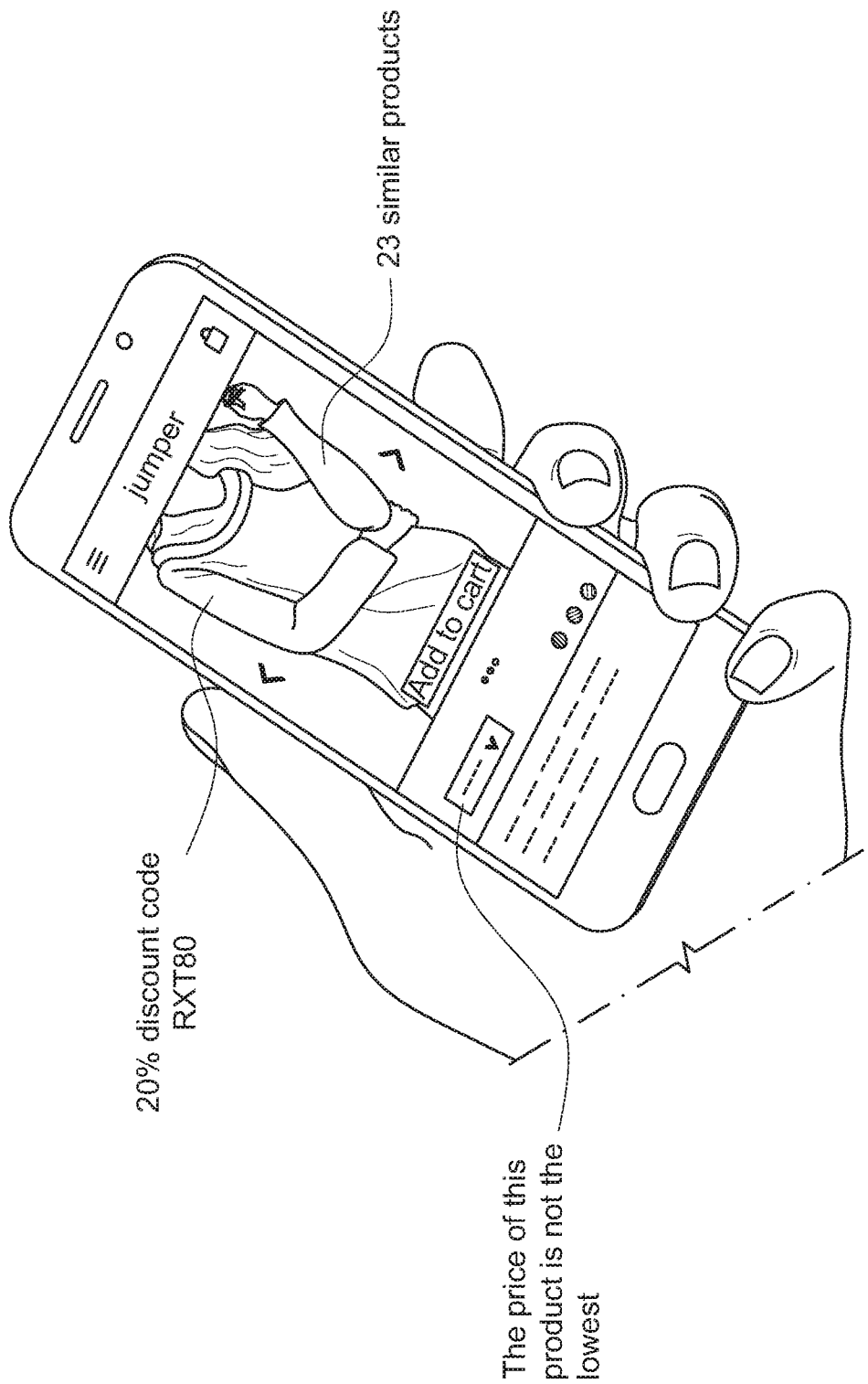
FIG. 13 is an actual use example diagram of the present invention.

For example, as shown in FIG. 13, the user is holding a mobile phone to browse clothing information. The screen of the mobile phone is the target area in the embodiment of the present invention. The information on the screen of the mobile phone is collected by using the augmented reality device, therefore the key information of the product "(type) product shopping, (shopping network name) XXX, (brand) XXX, (product) ladies dress, (price) ¥129.00" is obtained. Based on the collected information, it is judged that the current reading scene of the user is the shopping scene. Then, a background service module searches on the Internet according to the keywords of "(shopping network name) XXX, (brand) XXX, (product) ladies dress" and obtains a batch of search results, and searches for high-frequency keywords "discount code", "promotional price" and "similar products" from this batch of search results again, wherein the three keywords "discount code", "promotional price" and "similar products" have priorities from high to low, if the background service module obtains the relevant discount code, it calculates the discounted price and compares the same with a second-level promotional price, if the discounted price does not have a price advantage after the comparison, the background service module searches for a similar product with the highest popularity and the lowest price from the similar products and generates a result, and finally displays result content on the display interface of the augmented reality device.

The information display method proposed by the present invention at least has the following advantages and beneficial effects:

(1) Collection, processing, retrieval, integration and display are automatically completed, thereby improving the intelligence level of the system;

(2) The reading efficiency of users is improved; and (3) The results of the analysis and judgment are displayed directly to the users, and cumbersome operations and manual analysis and judgment of the users are not needed, so that the information is received more quickly and simply.

The embodiment of the present invention further provides an information display system. In some embodiments, the system includes modules for executing the steps of the information display method in any one of the above embodiments.

Those skilled in the art should understand that, the system provided by the present invention has the same beneficial effects as those in the foregoing embodiments, and details are not repeated herein.

Figure 12:
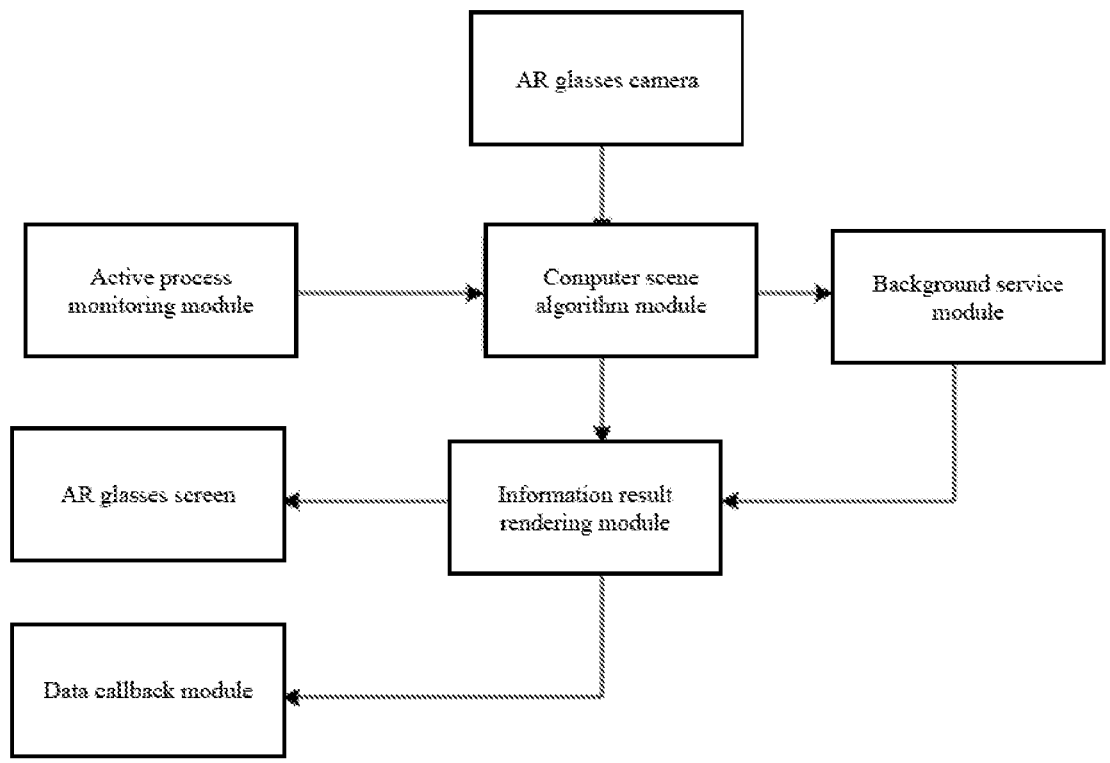
FIG. 12 is a structure block diagram of a terminal according to one embodiment of the present invention.

In some embodiments, please refer to FIG. 12, the information display system includes a user reading screen content capturing module, a user reading scene capturing service module, a computer vision scene algorithm module, a background service module, an information result rendering module, a data callback module, and AR glasses screen.

In some embodiments, specifically, the user reading screen content capturing module is an AR glasses camera, which collects relevant image data of text information and picture information presented on the screen that the user is watching, and collects image data used for measuring the relative distance, the relative size and the relative position of the screen that the user is watching relative to the AR glasses.

In some embodiments, specifically, the user reading scene capturing service module is an active process monitoring module, the module can be run as a background service in an electronic device that the user is using, and the type of the content information that the user is currently reading is judged by monitoring the type of the process currently active in the foreground in the current device and the address domain name visited by the browser. For example, when the user opens a shopping application via an Android smart phone, the user reading scene capturing service module running in the background can capture the type of the application currently opened by the user and send the result of the type to the computer vision scene algorithm module. The module can also be used as a browser extension plug-in to work with the browser of the user, for example, the user opens the browser on a personal computer, and visits the shopping website to detect the website domain name accessed by the user, then the user reading scene capturing service module can obtain the type of the website visited by the user at present and send the result to the computer vision scene algorithm module.

The computer vision scene algorithm module has two main functions: (1) measuring the relative distance, the relative size and the relative position of the screen that the user is watching relative to the AR glasses by calculating the vision algorithm, and sending these data to the information result rendering module. These contents determine the presentation position of the final result information on the AR glasses screen. (2) The computer vision scene algorithm module simultaneously includes multiple vision algorithm modules corresponding to different reading scenes of the user, according to the scene result information obtained by the user reading scene capturing service module, and the computer vision scene algorithm module opens the corresponding vision algorithm module. The advantage of this measure is to effectively reduces the occupation of hardware resources, and at the same time, by opening the visual algorithm module for a single reading scene, the analysis efficiency of the reading contents of the user is improved, and the accuracy is higher. The vision algorithm module analyzes the contents of the user, screens out a main content from the reading contents of the user and sends the same to the background service module in the form of one or more key results.

Specifically, the background service module is used for further processing the key contents read by the user, and after receiving the key result information from the computer vision algorithm module, the background service module further screens the keywords based on the result information and searches for related information on the Internet through these keywords. For example, the background service module receives a group of key product information "(type) product shopping, (shopping network name) XXX, (brand) XXX, (product) carat backpack, (price) ¥129.00", the background service module searches on the Internet based on the keywords of (shopping network name) XXX, (brand) XXX, (product) carat backpack" and obtain a batch of search results, and search for high-frequency keywords again from this batch of search results "discount code", "promotional price" and "similar products", wherein the three keywords "discount code", "promotional price" and "similar products" have priorities from high to low, if the background service module obtains the relevant discount code, the background service module calculates the discounted price and compares the same with the next-level promotional price, searches for the similar product with the highest popularity and the lowest price from the similar products and generates a result, if the discounted price has no price advantage after the comparison. The result with the most favorable price is superior to the original product result, result information is generated and is sent to the information result rendering module, and the result information can be a single item and can also contain multiple items of similar results, thereby providing more references and options for the user.

The information result rendering module specifically contains three functions: (1) the information result rendering module determines the placement position of the result information in the AR glasses according to the relative distance, the relative size and the relative position data of the screen from the computer vision scene algorithm module and sends the image content to the AR glasses screen. (2) The information result rendering module needs to receive sensor data from with three or six degrees of freedom from the AR glasses to fix the displayed result object around the screen viewed by the user or overlap the same on the screen viewed by the user, in this way, when the head of the user turns and generates other behaviors, it can be ensured that the display result object is still accurately displayed around the screen viewed by the user or overlapped on the screen viewed by the user. (3) The information result rendering module determines the display position and layout of the result information on the screen according to the number of items of the result information from the background service module and the number of characters in each piece of result information. The information result rendering module also distributes the result data that can be input to the data callback module at the same time, such as the discount code, the address, the product name, or the like.

The data callback module contains two functions: (1) judging the current use state of the user, for example, the user enters a shopping cart checkout state in the shopping scene, or is preparing to search for a certain product on the shopping website, or is ready to trade a certain stock in a stock trading application and is ready to enter the number of trades. (2) If the data callback module has previously obtained the data that can be input sent from the information result rendering module when the user is preparing to input content, the data callback module automatically inputs corresponding valid data in an input box according to the current use state of the user and the type of the input box appearing on the screen The AR glasses screen herein refers to the screen in the AR glasses, all images from the information result rendering module is displayed on the AR glasses screen, and the user views a superposed picture from this device and the AR screen when viewing the display device that is used by another user at present through the AR glasses screen, so as to achieve the implementation effect of the present invention.

Those skilled in the art should understand that, the present invention relates to two data transmission parts, that is, the data transmission equipped with a user smart device and the AR glasses, and the data transmission between the AR glasses and background service, and the wired or wireless medium of the data transmission satisfies the interactive experience of the present invention, and the wireless experience is the best.

Those skilled in the art should also understand that the information display system provided by the present invention at least has the following technical effects:

1. The user can obtain more effective extended information when viewing other smart electronic device displays through the AR glasses within a unit time, thereby helping the user get rid of the traditional linear reading manner and helping the user obtain more expanded and extended information within the unit time.

2. The understanding and reading speed of the user is improved, the present invention analyzes the main content presented on the screen of the electronic device read by the user and screens out important reading information through the computer vision algorithm and background service calculation within a short time, and immediately annotates the content in the AR glasses, and the user can grasp the key content presented on the current screen in a very short time when viewing the screen of the electronic device through the AR glasses.

3. The use behaviors of the user are analyzed intelligently, when the user needs to perform an input behavior, the data callback module judges whether any valid and accurate input data are received from the information result rendering module, and helps the user automatically fill in the corresponding input box, thereby greatly reducing the input burden on the user.

The embodiment of the present invention further provides a computer-readable storage medium, a computer program 111000 is stored thereon, and the program implements the steps of method in any one of the foregoing embodiments when executed by a processor 12000. The computer-readable storage medium can include, but not limited to, any type of disk, including floppy disks, optical disks, DVDs, CD-ROMs, micro drives, magneto-optical disks, ROMs, RAMs, EPROMs, EEPROMs, DRAMs, VRAMs, flash memory 11000 devices, magnetic cards or optical cards, nanosystems (including molecular memories 11000IC), or any type of media or device suitable for storing instructions and/or data. For the specific execution process, reference may be made to the specific description of the foregoing method embodiments, and details are not described herein.

Figure 11:
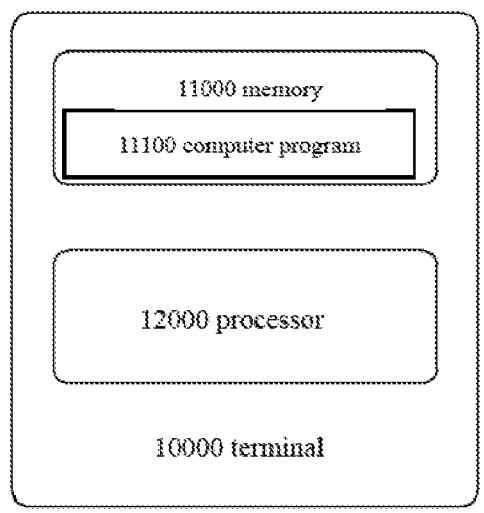
FIG. 11 is a structure block diagram of a device according to one embodiment of the present invention.

Please refer to FIG. 11, the embodiment of the present invention further provides a terminal 10000, including a memory 11000, a processor 12000, and a computer program 11100 stored on the memory 11000 and executable on the processor 12000. When the processor 12000 executes the computer program 11100, the indoor augmented reality information display method described in any one of the above embodiments is implemented.

In some embodiments, when the processor 12000 executes the computer program 11100, the method for establishing an information database described in any one of the foregoing embodiments is implemented.

In some other embodiments, when the processor 12000 executes the computer program 11100, it can not only implement the indoor augmented reality information display method according to any one of the above embodiments, but also can implement the method for establishing the information database in any one of the above embodiments. For the specific execution process, reference may be made to the specific description of the foregoing method embodiments, and details are not described herein.

In the embodiment of the present invention, the processor 12000 is the control center of a computer system, and can be the processor 12000 of a physical machine or the processor 12000 of a virtual machine. In the embodiment of the present invention, at least one instruction is stored in the memory 11000, and the instruction is loaded and executed by the processor 12000 to implement the method in the foregoing embodiments.

The terminal in the embodiment of the present invention can include, but not limited to, a smart phone, a tablet computer, a palmtop computer, a personal digital assistant (Personal Digital Assistant, PAD), an interactive smart tablet and other devices with display functions and augmented reality glasses (or AR Glasses, smart glasses) or other augmented reality devices (or AR devices), virtual reality devices (or VR devices), mobile computers, smart phones, smart watches, or other wearable devices, navigation apparatuses, or other devices that can collect position information data.

In another embodiment of the present invention, the processor 12000 can include one or more processing cores, such as a 4-core processor 12000, an 8-core processor 12000, and so on. The processor 12000 can be implemented in at least one hardware form of DSP (Digital Signal Processing, digital signal processing), FPGA (Field-Programmable Gate Array), PLA (Programmable Logic Array, programmable logic array). The processor 12000 can also include a main processor 12000 and a coprocessor 12000, the main processor 12000 is a processor 12000 used for processing data in a wake-up state, and is also called a CPU (Central Processing Unit, central processing unit 12000); and the coprocessor 12000 is a low power consumption processor 12000 used for processing data in a standby state.

The memory 11000 can include one or more computer-readable storage media, and the computer-readable storage medium can be non-transitory. The memory 11000 can further include a high-speed random access memory 11000, and a non-volatile memory 11000, such as one or more magnetic disk storage devices and flash memory storage devices. In some embodiments of the present invention, the non-transitory computer-readable storage medium in the memory 11000 is used for storing at least one instruction, and the at least one instruction is executed by the processor 12000 to implement the method in the embodiment of the present invention.

The above descriptions are only the preferred embodiments of the present invention, and do not limit the present invention in any form. Although the present invention has been disclosed in the preferred embodiments as above, the preferred embodiments are not used for limiting the present invention, anyone skilled familiar with this art can make some changes or modifications by using the technical contents disclosed above to serve as equivalent embodiments of equivalent changes, without departing from the scope of the technical solutions of the present invention, and any simple modifications, equivalent changes and modifications made to the above embodiments according to the technical essence of the present invention, without departing from the contents of the technical solutions of the present invention, still fall within.

What is claimed is:

1. An information display method, wherein the method comprises following steps:
    collecting a visual signal in a target area of a display device by using an augmented reality device;
    judging a user reading scene according to the visual signal;
    generating a first signal according to the user reading scene;
    generating a second signal after processing the first signal;
    detecting a device use state;
    if the device use state satisfies a device use preset condition, inputting the second signal in a device input window;
    collecting a target parameter of the display device;
    generating a display signal after fusing the second signal with the target parameter; and
    performing information display on a display interface of the augmented reality device according to the display signal.

2. The information display method according to claim 1, wherein,
    the target parameter is a relative position of the display device relative to the augmented reality device; and
    the target parameter is a size of the display device relative to a target area of the augmented reality device.

3. The information display method according to claim 2, wherein the visual signal comprises: image information of a reality scene in the target area of the display device and/or information of a foreground process of the display device.

4. The information display method according to claim 3, wherein when the visual signal comprises the information of the foreground process of the display device, the step of judging the user reading scene comprises:
    monitoring the foreground process of the display device;
    collecting an attribute of the foreground process of the display device;
    if the attribute of the foreground process satisfies a first preset condition, determining a type of the foreground process; and
    determining the user reading scene according to the type of the foreground process.

5. The information display method according to claim 4, wherein when the foreground process is a browser process, the step of judging the user reading scene comprises:
    monitoring a web site domain name currently visited by a browser;
    collecting an attribute of the web site domain name;

if the attribute of the website domain name satisfies a second preset condition, determining a type of the website domain name; and determining the user reading scene according to the type of the website domain name.

6. The information display method according to claim 3, wherein when the visual signal comprises the image information of the reality scene in the target area of the display device, the step of judging the user reading scene comprises:

determining the user reading scene represented by the image information by using a machine learning algorithm.

7. The information display method according to claim 1, wherein the step of generating the second signal after processing the first signal comprises:

analyzing all contents in the first signal;

screening out a first target content from all contents in the first signal; and generating the second signal according to the first target content.

8. The information display method according to claim 7, wherein the step of generating the second signal according to the first target content comprises:

screening the first target content and generating a second target content;

searching for the second target content, and generating a first initial search result;

generating a third target content according to the first initial search result;

searching for the third target content, and generating a second initial search result; and determining the second initial search result as the second signal.

9. The information display method according to claim 8, wherein the step of searching for the third target content comprises:

dividing the third target content into a plurality of different sub-contents according to a first set of preset conditions;

assigning different priorities to the plurality of the sub-contents according to a second set of preset conditions; and searching for the plurality of the sub-contents, and generating a first priority search result, a second priority search result and a third priority search result.

10. The information display method according to claim 9, wherein the step of generating the second initial search result comprises:

calculating the visual signal according to the first priority search result to generate a first calculation result; and if a parameter comparison result of the first calculation result and the second priority search result satisfies a particular preset condition, determining the first calculation result as the second initial search result.

11. The information display method according to claim 9, wherein the step of generating the second initial search result comprises:

calculating the visual signal according to the first priority search result to generate a first calculation result; and if a parameter comparison result of the first calculation result and the second priority search result does not satisfy a particular preset condition, determining the third priority search result as the second initial search result.

12. The information display method according to claim 1, wherein the second signal is an initial second signal and wherein the step of generating the display signal after fusing the initial second signal with the target parameter comprises:

updating the target parameter in real time;

adjusting the display position of the initial second signal according to the target parameter; and determining the adjusted second signal as the display signal.

13. The information display method according to claim 12, wherein prior to the step of performing information display on the display interface of the augmented reality device according to the display signal, the method further comprises:

adjusting a display number and a layout design of the initial second signal according to the target parameter.

14. The information display method according to claim 12, wherein prior to the step of determining the adjusted second signal as the display signal, the method further comprises:

adjusting a display area according to the target parameter and a character size of each content in the initial second signal.

15. The information display method according to claim 1, wherein a display manner of performing information display on the display interface of the augmented reality device is:

performing superposed display on the target area of the display device; and/or, determining a display area according to the target parameter beyond the target area of the display device for display.

* * * * *